US012020678B2

(12) United States Patent
Stoerger

(10) Patent No.: US 12,020,678 B2
(45) Date of Patent: *Jun. 25, 2024

(54) NOISE CANCELLING SOUNDBAR DEVICE AND SYSTEM

(71) Applicant: Richard Stoerger, New Rochelle, NY (US)

(72) Inventor: Richard Stoerger, New Rochelle, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/658,414

(22) Filed: Apr. 7, 2022

(65) Prior Publication Data

US 2022/0230615 A1 Jul. 21, 2022

Related U.S. Application Data

(63) Continuation-in-part of application No. 17/088,008, filed on Nov. 3, 2020, now Pat. No. 11,330,369.

(60) Provisional application No. 62/930,445, filed on Nov. 4, 2019.

(51) Int. Cl.

*G10K 11/178* (2006.01)
*H04R 1/26* (2006.01)
*H04R 3/12* (2006.01)
*H04S 7/00* (2006.01)

(52) U.S. Cl.

CPC ......... *G10K 11/17823* (2018.01); *H04R 1/26* (2013.01); *H04R 3/12* (2013.01); *H04S 7/301* (2013.01)

(58) Field of Classification Search

CPC ...... G10K 11/17823; H04R 1/26; H04R 3/12; H04S 7/301

See application file for complete search history.

(56) References Cited

U.S. PATENT DOCUMENTS 10,515,619 B1 * 12/2019 Chang ...................... A47G 9/10
11,330,369 B2 * 5/2022 Stoerger ................... H04R 3/02
2017/0053637 A1 * 2/2017 DeFranks ........ G10K 11/17817

* cited by examiner

*Primary Examiner* — Andrew L Sniezek

(74) *Attorney, Agent, or Firm* — Kevin Schraven; Anooj Patel; Hankin Patent Law, APC

(57) ABSTRACT

A noise cancelling soundbar system that may include one or more noise cancelling soundbars integrated with additional noise cancelling soundbars and slave devices. The soundbar system may be mounted or integrated into a wall, a headboard, or other furniture. The system may be in communication with external microphones and may be controlled using a control interface, such as a remote control.

30 Claims, 9 Drawing Sheets

NOISE CANCELLING SOUNDBAR DEVICE AND SYSTEM

CROSS-REFERENCE TO RELATED APPLICATIONS

This application is a Continuation-in-Part of U.S. Non-Provisional patent application Ser. No. 17/088,008, filed on Nov. 3, 2020, the contents of which are expressly incorporated herein by this reference as though set forth in their entirety. U.S. Non-Provisional patent application Ser. No. 17/088,008 claims the benefit of U.S. Provisional Patent Application No. 62/930,445, filed on Nov. 4, 2019, the contents of which are expressly incorporated herein by this reference as though set forth in their entirety.

FIELD OF USE

The present disclosure relates generally to devices, systems, and methods for electronic soundbars, and more specifically to a noise cancelling soundbar system which creates semi-soundproof zones for its nearby users without requiring the use of headphones or expensive soundproofing insulation.

BACKGROUND

Soundbars are a popular accessory for use with TVs and other audiovisual media devices due to their small form factor, powerful sound, and ease of installation. Soundbars allow users to customize their home entertainment setup and greatly enhance the audio output of their media devices without taking up much space. In particular, soundbars are frequently used to enhance the sound of flat screen TVs, which often do not have the physical device space available for a powerful built-in speaker system.

However, while commercial soundbars provide an enhanced viewing and listening experience for persons engaged in watching and/or listening to the media being played, this same powerful audio may also bother or annoy people in the same or close rooms who are not interested in viewing the media at that moment. This is a very common problem in crowded apartment complexes, for example, where the sounds of one person's soundbar-augmented audio can easily spill over into a neighboring apartment. This overflow noise can be especially problematic within a single residence, as loud sounds from media can easily annoy roommates, family members, or other house guests.

To avoid this situation of unwanted spillover noise, the person wanting to listen to audiovisual media essentially has three options: (1) lower the media and/or soundbar volume; (2) wear headphones; or (3) soundproof the media viewing area (such as a living room or bedroom). However, none of these solutions are very satisfying.

As to the first option: Lowering the media/soundbar volume often results in the viewer's enjoyment being substantially reduced, especially when the volume must be lowered to a level that the audio can no longer be heard clearly. In many cases, lowering the volume may not be an effective or practical solution at all, such as when trying to watch TV without disturbing a nearby sleeping partner. In this case, the volume would need to be so low as to be virtually silent.

As to the second option: While headphones generally allow a person to listen to media at an enjoyable volume without disturbing nearby persons, they are often uncomfortable when worn for prolonged periods of time. Headphones are particularly uncomfortable if worn to bed, as may be attempted when trying to listen to music or watch a show without disturbing a nearby sleeping partner who has fallen asleep or is trying to fall asleep.

As to the third option: Soundproofing one's home or room(s) is often prohibitively expensive. Additionally, soundproofing an individual room does nothing to address potential sound overflow issues within the same room, where spillover audio may still disturb nearby non-listeners.

Thus, what is needed is a convenient, comfortable, and affordable way for users to enjoy audiovisual media without disturbing non-listeners nearby, without having to wear headphones.

SUMMARY

To minimize the limitations in the cited references, and to minimize other limitations that will become apparent upon reading and understanding the present specification, the present specification discloses a new and improved noise cancelling soundbar device and system.

In one embodiment, the noise cancelling soundbar of the present disclosure may comprise a loudspeaker, an integrated power amplifier, and an audio input communication module. Preferably, the noise cancelling soundbar may combine multiple audio-related technologies into a form factor specifically optimized for use in bedrooms. However, the noise cancelling soundbar may be used in any environment where a controlled auditory space is desired, such as living rooms, dining rooms, or office spaces.

In one embodiment, the noise cancelling soundbar may comprise one or more loudspeakers, an integrated power amplifier, and an audio input communication module. The noise cancelling soundbar may be configured to receive an audio signal input from a media source, such as a TV, smartphone, or other device, and play the audio signal from the one or more loudspeakers. In one embodiment, the one or more loudspeakers may preferably be adjustable via an actuator, which allows the one or more loudspeakers to be rotated or pivoted to precisely aim the audio output of the noise cancelling soundbar. By carefully positioning the noise cancelling soundbar and the one or more loudspeakers, it is possible to greatly reduce the level of sound required for the loudspeaker output sounds to be heard from a listener, reducing the amount of unwanted audio "spillover" which may disrupt nearby persons.

For example, existing soundbars are commonly installed directly underneath a TV screen. When a user sits some distance from the TV, such as on a couch or bed across the room, the audio output of the soundbar must be loud enough to be heard by the user from across the room. By contrast, the noise cancelling soundbar of the current disclosure may be installed within a headboard of a bed or headrest of a couch, such that a listener watching TV from his or her bed (or couch) requires a much lower loudspeaker output volume, due to the smaller distance between the soundbar loudspeakers and the listener's ears. The actuators may be used to directionally adjust the one or more loudspeakers, such that the one or more loudspeakers may aim directly at the listener's ears and reduce the required loudspeaker audio output level even further.

One embodiment may be a noise cancelling soundbar system, comprising a first noise cancelling soundbar and a second noise cancelling soundbar. Preferably, each noise cancelling soundbar may comprise one or more loudspeakers, an audio input communication module, one or more microphones, and an active noise cancellation module. The first and second noise cancelling soundbars may be used in connection with each other to create a semi-soundproofed listening zone at each individual noise cancelling soundbar.

The one or more microphones may be used to measure nearby ambient noise. The measured ambient noise may then be processed by the active noise cancellation module, such that a negative sound output pattern is generated. In a preferred embodiment, any ambient noise in the vicinity of the first noise cancelling soundbar (including sounds that are not generated by the first noise cancelling soundbar, such as snoring by a user of the first noise cancelling soundbar) may be measured by the one or more microphones on the first noise cancelling soundbar. The second noise cancelling soundbar may then communicate with the one or more microphones of the first noise cancelling soundbar to obtain accurate ambient noise data present in a vicinity of the first noise cancelling soundbar. The second noise cancelling soundbar may then process the ambient noise data with an active noise cancellation module, to produce a negative sound output pattern that is specifically designed to cancel out the ambient noise emanating from the vicinity of the first noise cancelling soundbar. The one or more loudspeakers of the second noise cancelling soundbar may then play the negative sound output pattern, such that the negative sound output pattern destructively interferes with the sound waves of the ambient noise. In this manner, the second noise cancelling soundbar may insulate a user of the second noise cancelling soundbar from the ambient noise in the vicinity of the first noise cancelling soundbar.

The first noise cancelling soundbar may use the corresponding microphones, active noise cancelling module(s), and loudspeakers to similarly insulate a user of the first noise cancelling soundbar from ambient noise pertaining to the second noise cancelling soundbar. As a result, each user of a noise cancelling soundbar may listen (or not) to the media of their choosing without disturbing the user of the other soundbar.

Each noise cancelling soundbar may preferably be positioned near (which may be in the range of one inch to four feet, or otherwise in close proximity to) a listener's head/ears, reducing the level of sound required for the user to hear the loudspeaker output audio. Suitable locations for installing a noise cancelling soundbar may include, for example, bedrooms (in a bed headboard), or living rooms and office spaces (in the headrests of couches and chairs).

One embodiment may be a noise cancelling soundbar, comprising: one or more loudspeakers, an integrated power amplifier, an audio input communication module, one or more microphones, and an active noise cancelling module; wherein the one or more microphones may be configured to measure ambient noise; wherein the active noise cancelling module may be configured to process the ambient noise, to create a negative output that may be configured to destructively interfere with the ambient noise; wherein the negative output audio may be configured to be emitted from the one or more loudspeakers, such that the ambient noise may be substantially cancelled or reduced, and; wherein the noise cancelling soundbar may be configured to receive an audio signal from one or more media sources and subsequently play the audio signal from the one or more loudspeakers. In another embodiment, the noise cancelling soundbar may further comprise one or more adjustable bases and one or more actuators; wherein the one or more loudspeakers may be mounted on the one or more adjustable bases; wherein the one or more actuators may be configured to adjust the one or more adjustable bases. The noise cancelling soundbar may be installed in any environment with sufficient space, including, but not limited to, the headboard of a bed or the back of a chair. Preferably, the one or more adjustable bases may be configured to direct the audio output signal from the one or more loudspeakers to a listener laying in the bed and/or chair.

One embodiment may be a noise cancelling soundbar system, comprising: a first noise cancelling soundbar and a second noise cancelling soundbar, wherein the first and second noise cancelling soundbars may each individually comprise, respectively: a first/second set of one or more loudspeakers; a first/second audio input communication module; at least one first/second ambient microphone; at least one first/second near field microphone, and a first/second active noise cancellation module. In a preferred embodiment, the first noise cancelling soundbar and the second noise cancelling soundbar may be configured to be integrated into opposite sides of a headboard of a bed that is configured to be used by two listeners. The at least one first ambient microphone and the at least one second ambient microphone may be on opposite distal ends of the headboard. The at least one first near field microphone and the at least one second near field microphone may be proximate to each other at a middle portion of the headboard, and be configured to, respectively, measure a first and second nearfield noises coming from an opposite side of the bed, wherein the at least one ambient microphone and the at least one second ambient microphone may be configured to, respectively, measure a first ambient noise and a second ambient noise. The first and second ambient noise cancelling modules may be configured to process the first and second ambient noises, such that a first and a second negative output audios are created, which may be configured to destructively interfere, relatively, with the first and second ambient noises. Similarly, the first and second active cancelling modules may be configured to process the first and second nearfield noises, such that a first and second negative output audios are created that may be configured to destructively interfere, relatively, with the first and second nearfield noises. Alternatively, the first and second active noise cancelling modules may be configured to process, respectively, both the first and second nearfield noises and the first and second ambient noises, such that a first and second negative output audios may be created that may be configured to destructively interfere, relatively, with both the first and second nearfield noises and the first and second ambient noises.

Regarding the cancellation of ambient audio: the first and second negative output audios may be configured to be respectively emitted from the first and second sets of one or more loudspeakers, such that the first and second ambient noises may be substantially cancelled or reduced. Regarding the cancellation of nearfield audio: the first and second negative output audios may be configured to be respectively emitted from the first and second sets of one or more loudspeakers, such that the first and second nearfield noises may be substantially cancelled or reduced. In some instances, the ambient and nearfield audio may both be substantially cancelled or reduced, wherein the first and second negative output audios may be configured to be respectively emitted from the first and second sets of one or more loudspeakers, such that both the first and second nearfield noises, and the first and second ambient noises may be substantially cancelled or reduced.

Preferably, the first and second noise cancelling soundbars may be configured to receive an audio signal from one or more media sources and subsequently play the audio signal from the first and second sets of one or more loudspeakers; wherein the first noise cancelling soundbar may comprise a first set of one or more adjustable bases and a first set of one or more actuators; wherein the second noise cancelling soundbar may comprise a second set of one or more adjustable bases and a second set of one or more actuators; wherein the first set of one or more loudspeakers may be mounted on the first set of one or more adjustable bases; wherein the first set of one or more actuators may be configured to adjust the first set of one or more adjustable bases; wherein the second set of one or more loudspeakers may be mounted on the second set of one or more adjustable bases; and wherein the second set of one or more actuators may be configured to adjust the second set of one or more adjustable bases.

One embodiment may be a noise cancelling system, comprising: a first noise cancelling soundbar; wherein the first noise cancelling soundbar comprises: at least one first loudspeaker; at least one first microphone, which may be configured to sense and measure a first ambient noise; and a first active noise cancelling module, which may be configured to be in communication with the at least one first loudspeaker and the at least one first microphone; wherein the first active noise cancelling module may process the first ambient noise to create a first negative output audio; wherein the first negative output audio may be configured to be projected from the at least one first loudspeaker; and wherein the first negative output audio, when projected from the at least one first loudspeaker, destructively interferes with the first ambient noise; a second noise cancelling soundbar; wherein the second noise cancelling soundbar comprises: at least one second loudspeaker; at least one second microphone, which may be configured to sense and measure a second ambient noise; and a second active noise cancelling module, which may be configured to be in communication with the at least one second loudspeaker and the at least one second microphone; wherein the second active noise cancelling module may process the second ambient noise to create a second negative output audio; wherein the second negative output audio may be configured to be projected from the at least one second loudspeaker; and wherein the second negative output audio, when projected from the at least one second loudspeaker, destructively interferes with the second ambient noise; wherein the first and second noise cancelling soundbar are configured to be in communication with each other, such that they work together to destructively interfere with the first and second ambient noises. In some embodiments, the first and second noise cancelling soundbars may be physically connected to each other. In others, they may communicate or otherwise be connected by a wire connection or a wireless connection. The first and second noise cancelling soundbars may be configured to be engaged to or in the structures selected from the group of structures consisting of one or more of: a wall; a headboard; and combinations thereof. The first noise cancelling soundbar may further comprise: at least one first adjustable loudspeaker base and at least one first adjustable microphone base; wherein the at least one first loudspeaker may be mounted on the at least one first adjustable loudspeaker base; wherein the at least one first microphone may be mounted on the at least one first adjustable microphone base; wherein the at least one first adjustable loudspeaker base may be configured to be adjustable so as to adjust an angle of the at least one first loudspeaker, thereby adjusting the first negative output audio, such that the first negative output audio may be configured to destructively interfere with the first ambient noise; and wherein the at least one first adjustable microphone base may be configured to adjust an angle of the at least one first microphone to improve sensing and measuring of the first ambient noise. The second noise cancelling soundbar may further comprise: at least one second adjustable loudspeaker base; and at least one second adjustable microphone base; wherein the at least one second loudspeaker may be mounted on the at least one second adjustable loudspeaker base; wherein the at least one second microphone may be mounted on the at least one second adjustable microphone base; wherein the at least one second adjustable loudspeaker base may be configured to be adjustable so as to adjust an angle of the at least one second loudspeaker, thereby adjusting the second negative output audio, such that the second negative output audio may be configured to destructively interfere with the second ambient noise; and wherein the at least one second adjustable microphone base may be configured to adjust an angle of the at least one second microphone to improve sensing and measuring of the second ambient noise. The first ambient noise experienced by a user is substantially reduced when the first ambient noise is destructively interfered with by the first negative audio output; and wherein the second ambient noise experienced by a second user is substantially reduced when the second ambient noise is destructively interfered with by the second negative audio output. The first and second noise cancelling soundbars may be configured to receive an audio signal from one or more media sources and subsequently play the audio signal from the first and second loudspeakers. The first and second ambient noises may be substantially the same. The first and second noise cancelling soundbars may be configured to be controlled by a control interface, such as a remote control device. The noise cancelling system may further comprise at least one external microphone, which may be configured to sense and measure an external ambient noise; wherein the at least one external microphone may be configured to be in communication with first active noise cancelling module; wherein the first active noise cancelling module may process the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise. The at least one first noise cancelling soundbar may be configured to be in communication with at least one external microphone, which may be configured to sense and measure an external ambient noise; wherein the at least one external microphone may be configured to be in communication with first active noise cancelling module; wherein the first active noise cancelling module may process the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise.

Another embodiment may be a noise cancelling system, comprising: a first noise cancelling soundbar; wherein the first noise cancelling soundbar comprises: at least one first loudspeaker; at least one first microphone, which may be configured to sense and measure a first ambient noise; and a first active noise cancelling module, which may be configured to be in communication with the at least one first loudspeaker and the at least one first microphone; wherein the first active noise cancelling module processes the first ambient noise to create a first negative output audio; wherein the first negative output audio may be configured to be projected from the at least one first loudspeaker; and wherein the first negative output audio, when projected from the at least one first loudspeaker, destructively interferes with the first ambient noise; a noise cancelling soundbar slave device; wherein the noise cancelling soundbar slave device comprises: at least one slave loudspeaker, which may be configured to be in communication with the first active noise cancelling module; and at least one slave microphone, which may be configured to be in communication with the first active noise cancelling module, and which may be configured to sense and measure a slave ambient noise; wherein the first active noise cancelling module processes the slave ambient noise to create a slave negative output audio; wherein the second negative output audio may be configured to be projected from the at least one slave loudspeaker; and wherein the slave negative output audio, when projected from the at least one slave loudspeaker, destructively interferes with the slave ambient noise; and wherein the noise cancelling soundbar slave device may be configured to be in communication with the first noise cancelling soundbar, such that they work together to destructively interfere with the first and slave ambient noises. The first noise cancelling soundbar may be physically connected to the noise cancelling soundbar slave device or it may be separate and connected via wire or wirelessly. The first noise cancelling soundbar and the noise cancelling soundbar slave device may be configured to be engaged to or in the structures selected from the group of structures consisting of one or more of: a wall; a headboard; and combinations thereof. The first noise cancelling soundbar may further comprise: at least one first adjustable loudspeaker base; and at least one first adjustable microphone base; wherein the at least one first loudspeaker may be mounted on the at least one first adjustable loudspeaker base; wherein the at least one first microphone may be mounted on the at least one first adjustable microphone base; wherein the at least one first adjustable loudspeaker base may be configured to be adjustable so as to adjust an angle of the at least one first loudspeaker, thereby adjusting the first negative output audio, such that the first negative output audio is configured to destructively interfere with the first ambient noise; and wherein the at least one first adjustable microphone base may be configured to adjust an angle of the at least one first microphone to improve sensing and measuring of the first ambient noise. The noise cancelling soundbar slave device may further comprise: at least one slave adjustable loudspeaker base; and at least one slave adjustable microphone base; wherein the at least one slave loudspeaker may be mounted on the at least one slave adjustable loudspeaker base; wherein the at least one slave microphone may be mounted on the at least one slave adjustable microphone base; wherein the at least one slave adjustable loudspeaker base may be configured to be adjustable so as to adjust an angle of the at least one slave loudspeaker, thereby adjusting the slave negative output audio, such that the slave negative output audio is configured to destructively interfere with the slave ambient noise; and wherein the at least one slave adjustable microphone base may be configured to adjust an angle of the at least one slave microphone to improve sensing and measuring of the slave ambient noise. The first ambient noise experienced by a user is substantially reduced when the first ambient noise is destructively interfered with by the first negative audio output; and wherein the slave ambient noise experienced by a second user is substantially reduced when the slave ambient noise is destructively interfered with by the slave negative audio output. The first noise cancelling soundbar may be configured to receive an audio signal from one or more media sources and subsequently play the audio signal from the at least one first loudspeaker and the at least one slave loudspeaker. Sometimes, the first and slave ambient noises may be substantially the same. The first noise cancelling soundbar and the noise canceling soundbar slave device may be configured to be controlled by a control interface. The noise cancelling system may further comprise at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise. Rather than being part of the system, the remote/external microphone can be an external system that is connected to the present system. Specifically, the at least one first noise controlling soundbar may be configured to be in communication with at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise.

Another embodiment may be a noise cancelling system, comprising: a first noise cancelling soundbar; wherein the first noise cancelling soundbar comprises: at least one first loudspeaker; at least one first microphone, which may be configured to sense and measure a first ambient noise; a first active noise cancelling module, which may be configured to be in communication with the at least one first loudspeaker and the at least one first microphone; at least one first adjustable loudspeaker base; and at least one first adjustable microphone base; wherein the first active noise cancelling module processes the first ambient noise to create a first negative output audio; wherein the first negative output audio may be configured to be projected from the at least one first loudspeaker; and wherein the first negative output audio, when projected from the at least one first loudspeaker, destructively interferes with the first ambient noise; wherein the first noise cancelling soundbar may be configured to be engaged to or in the structures selected from the group of structures consisting of one or more of: a wall; a headboard; and combinations thereof; wherein the at least one first loudspeaker may be mounted on the at least one first adjustable loudspeaker base; wherein the at least one first microphone may be mounted on the at least one first adjustable microphone base; wherein the at least one first adjustable loudspeaker base may be configured to be adjustable so as to adjust an angle of the at least one first loudspeaker, thereby adjusting the first negative output audio, such that the first negative output audio is configured to destructively interfere with the first ambient noise; and wherein the at least one first adjustable microphone base may be configured to adjust an angle of the at least one first microphone to improve sensing and measuring of the first ambient noise. The first ambient noise experienced by a user is substantially reduced when the first ambient noise is destructively interfered with by the first negative audio output. The first noise cancelling soundbar may be configured to receive an audio signal from one or more media sources and subsequently play the audio signal from the first loudspeaker. The first noise cancelling soundbar may be configured to be controlled by a control interface. The noise cancelling system may further comprise at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise. Alternatively, the at least one first noise cancelling soundbar may be configured to be in communication with at least one external microphone, which may be configured to sense and measure an external ambient noise; wherein the at least one external microphone may be configured to be in communication with first active noise cancelling module; wherein the first active noise cancelling module processes the external ambient noise to create an external negative output audio; wherein the external negative output audio may be configured to be projected from the at least one first loudspeaker; and wherein the external negative output audio, when projected from the at least one first loudspeaker, destructively interferes with the external ambient noise.

By extending the above methodology to multiple noise cancelling soundbars (e.g., three or more), it will be apparent to those of skill in the art that the devices, systems, and methods of the present disclosure may be modified to include larger numbers of soundbars used in tandem, to create an interconnected network of semi-soundproof listening zones, one for each noise cancelling soundbar in the network.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE ILLUSTRATIVE EMBODIMENTS

Figure 1:
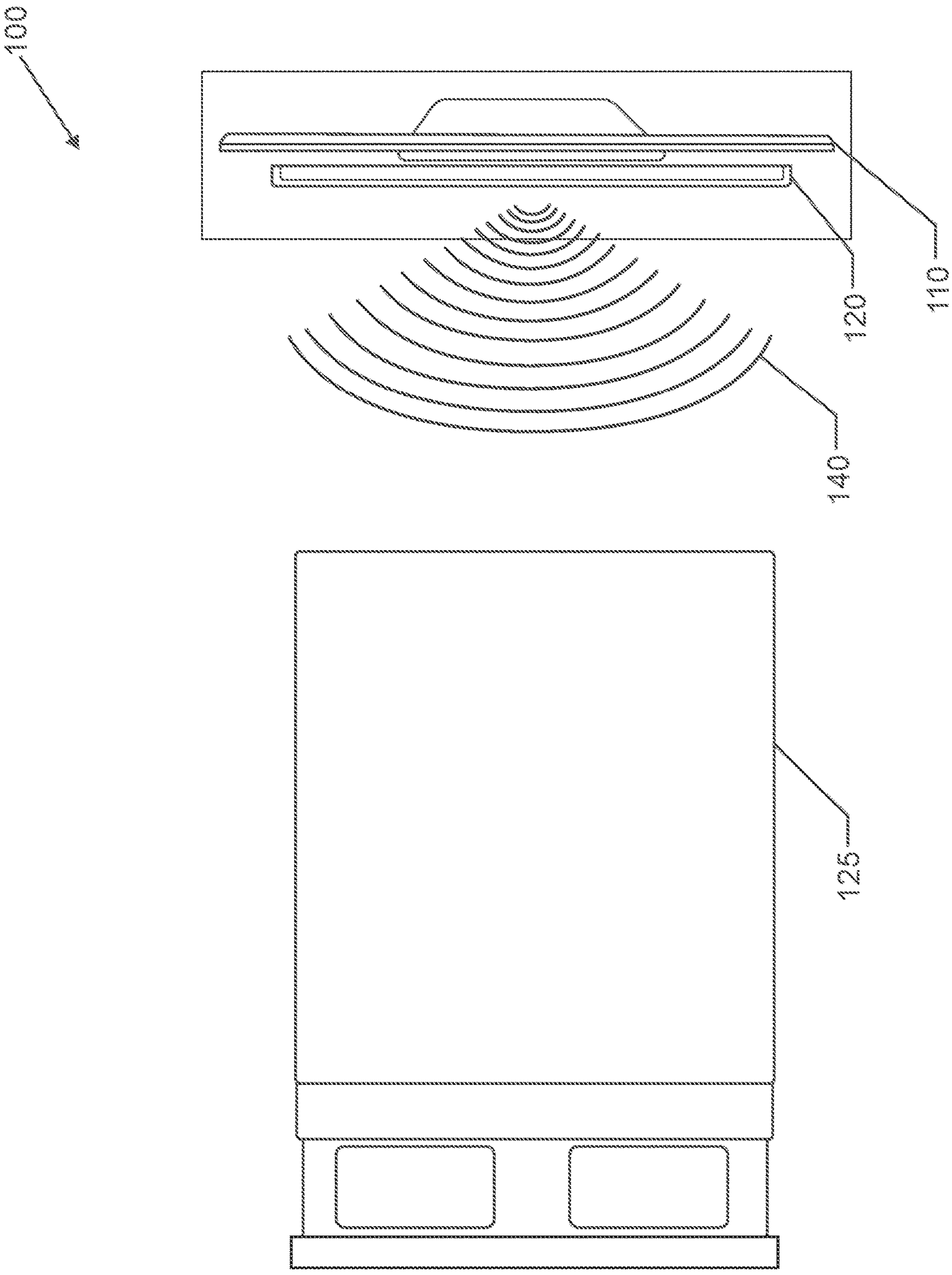
Fig. 1 [PRIOR ART]
FIG. 1 is an illustration of the prior art, in which a soundbar is installed near and under a television set up in a bedroom.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term “substantially” refers to the complete or nearly complete extent or degree of an action, characteristic, property, state, structure, item, or result. For example, in one embodiment, an object that is “substantially” located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of “substantially” is also equally applicable when used in a negative connotation to refer to the complete or near complete lack of an action, characteristic, property, state, structure, item, or result.

As used herein, the terms “approximately” and “about” generally refer to a deviance of within 5% of the indicated number or range of numbers. In one embodiment, the term “approximately” and “about,” may refer to a deviance of between 0.0001-10% from the indicated number or range of numbers.

As used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by use of the antecedent “about,” it will be understood that the particular value forms another embodiment. It will be further understood that the endpoints of each of the ranges are signified both in relation to the other endpoint, and independently of the other endpoint.

“Optional” or “optionally” means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "noise cancelling soundbar" generally refers to a soundbar or array of sound equipment that may be equipped with active noise cancelling technology.

"Ambient sound(s)" and "ambient sound waves" refer generally to sounds waves present in the vicinity of a noise cancelling soundbar of the present disclosure. This includes, but is not limited to, electronically generated audio (such as that produced by a loudspeaker in response to an electrical signal) and naturally generated audio (such as that produced by people talking, traffic and construction noises, etc.).

"Disruptive Audio" refers to any ambient sound waves that a user of a noise cancelling sound board of the present disclosure is not actively trying to listen to, or is trying to avoid listening to.

The terms "negative sound wave(s)" and "negative sound output pattern" refer to machine-generated soundwaves that are calculated to destructively interfere with a counterpart disruptive audio.

"Media" refers to any form of audio and/or audiovisual content that includes an audio component for listeners to hear.

"View" refers to the act of engaging with audio and/or audiovisual media, regardless of whether the viewer is looking and listening, or only listening.

The term "set" generally refers to a group of things, such as loudspeakers, but there may be only one thing in any specific group.

Embodiments of the present disclosure generally relate to the field of soundbars. More specifically, the present disclosure relates to a noise cancelling soundbar which, through a combination of a small form factor, targeted audio output, and active noise cancelling, allows its users to listen to audio or audiovisual media without disturbing nearby users.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments. It is to be understood that the methods and systems are not limited to specific methods, specific components, or to particular implementations. It is also to be understood that the terminology used herein is for the purpose of describing particular embodiments only and is not intended to be limiting.

FIG. 1 is an illustration showing a common soundbar setup 100 as used in the prior art. As shown in FIG. 1, a soundbar 120 may receive audio input from a media device 110, such as a TV. The soundbar 120 is installed directly underneath the media device 110, such that the audio output 140 of the soundbar 120 needs to be loud enough to clearly reach a bed 125. In many situations, the length of the bed 125 requires that the audio output 140 be turned to such a volume that there is often spillover audio that disturbs the peace and quiet of other people nearby.

Figure 2:
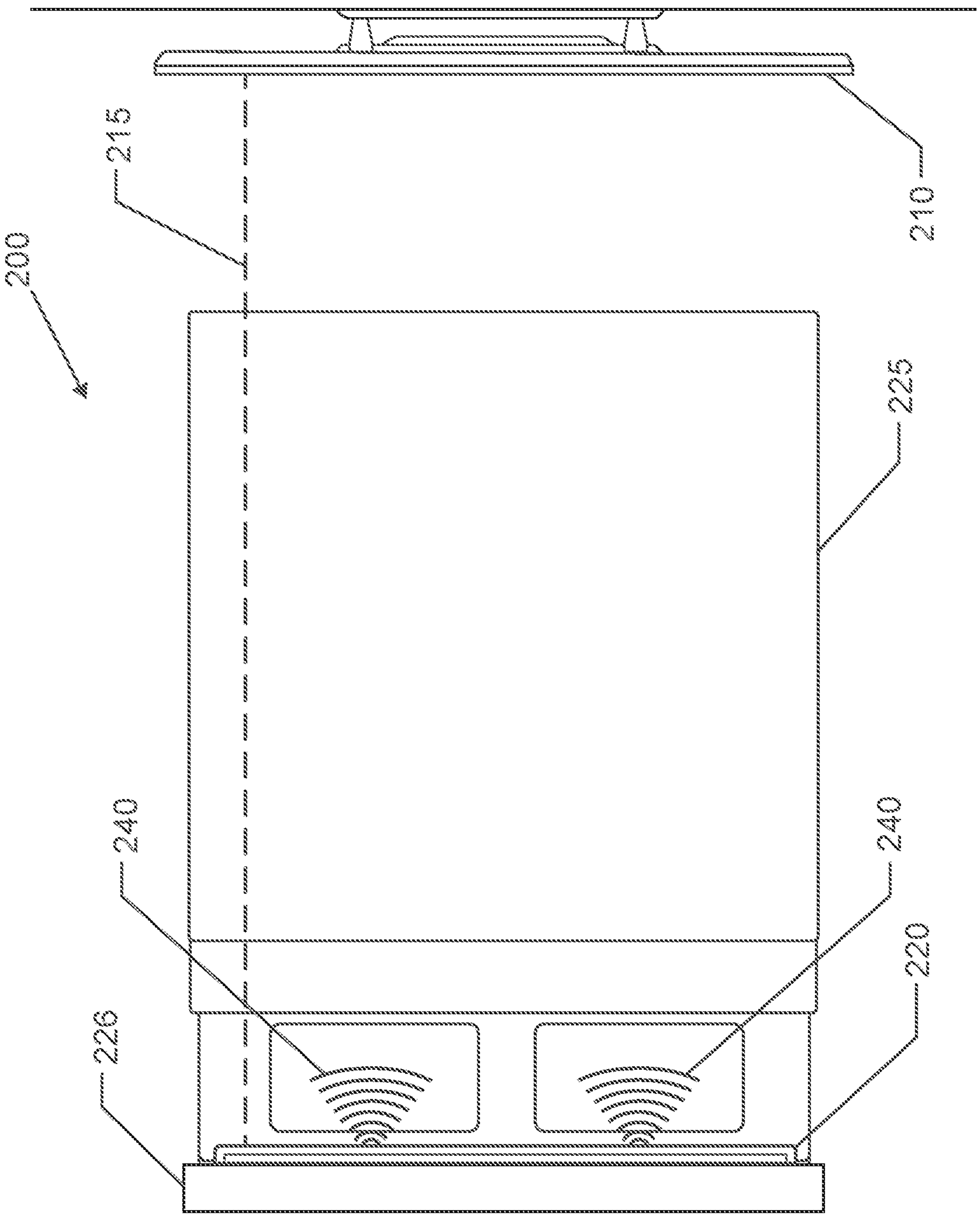
FIG. 2 shows an illustration of one embodiment of a noise cancelling soundbar.

FIG. 2 is an illustration showing one embodiment of a noise cancelling soundbar setup 200. As shown in FIG. 2, a noise cancelling soundbar 220 may receive an audio input 215 from a media device 210, such as a television. The audio input 215 may be transmitted to the noise cancelling soundbar 220 wirelessly or with a wired connection. Rather than being installed directly under the media device 210, the noise cancelling soundbar 220 may preferably be installed directly on, in, or near a headboard 226 of a bed 225. By placing the noise cancelling soundbar 220 on, in, or near the headboard 226, the audio output 240 of the noise cancelling soundbar 220 requires a much lower volume in order to be heard by anyone trying to view the programming of the media device 210 while lying down in the bed 225. While reference is made to a bed 225, it is to be understood that the noise cancelling soundbar 220 may similarly be installed on or near the headrests of sofas, lounge chairs, etc., to produce the same effect.

Figure 3:
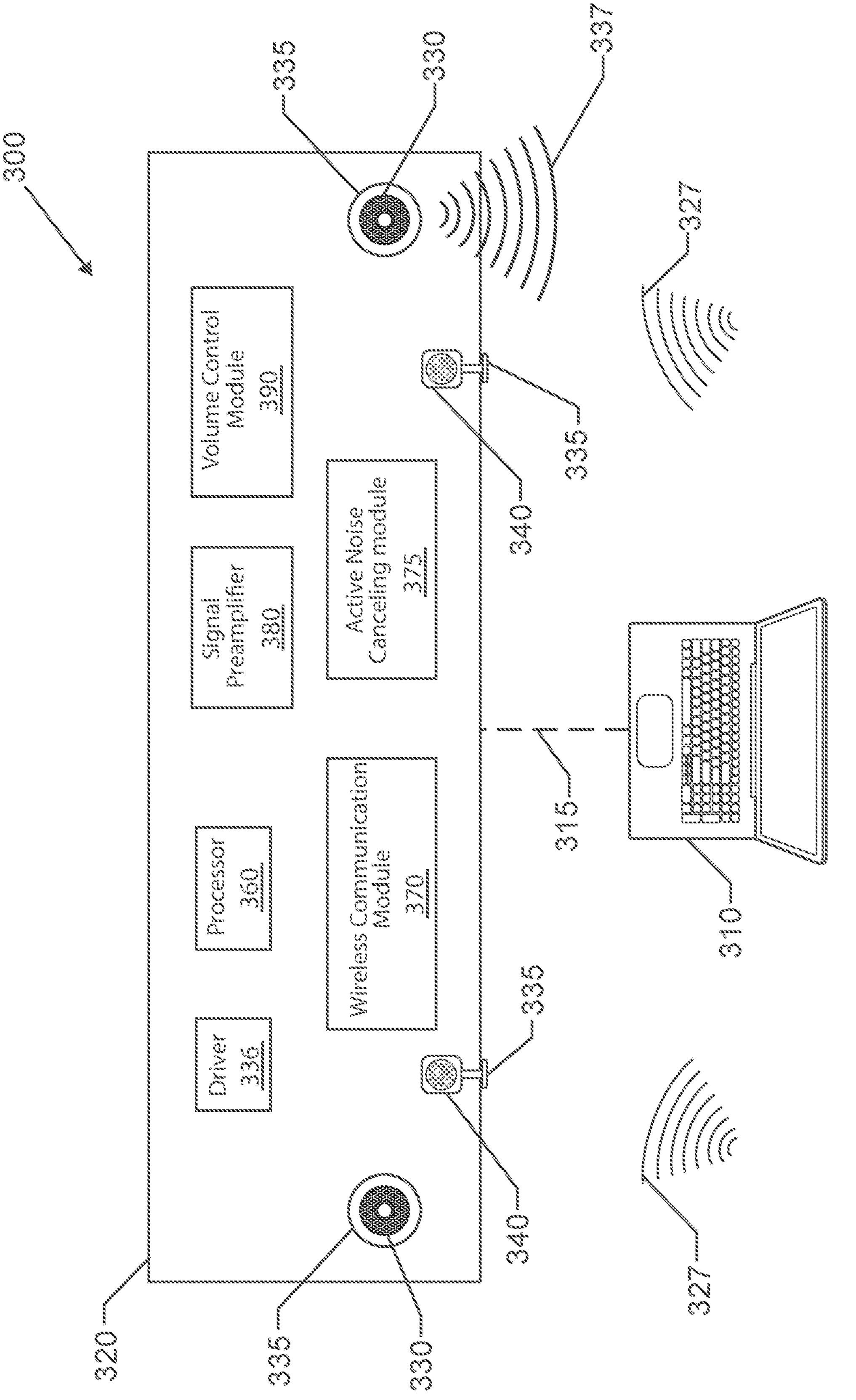
FIG. 3 shows a detailed schematic view of one embodiment of a noise cancelling soundbar.

FIG. 3 is an illustration showing a detailed view of a noise cancelling soundbar system 300. As shown in FIG. 3, the noise cancelling soundbar system 300 may comprise a noise cancelling soundbar 320, one or more loudspeakers 330, one or more microphones 340, a processor 360, a wireless communication module 370, and a signal preamplifier 380. The noise cancelling soundbar 320 may receive an audio input signal 315 from a media device 310, such as a television (TV), smartphone, tablet, or other device capable of playing audio and/or audiovisual media. The audio input signal 315 may be transmitted to the noise cancelling soundbar 320 wirelessly and be received by the wireless communication module 370. The audio input signal 315 may, alternatively, be transmitted to the noise cancelling soundbar 320 via a wired connection (not shown).

The audio input signal 315 may be enhanced by the signal preamplifier 380, and then subsequently transmitted to the one or more loudspeakers 330 for broadcasting. The one or more loudspeakers 330 may use the (amplified) audio input signal 315 to create a soundbar output audio 337. The soundbar output audio 337 may be a faithful reproduction of the audio input signal 315 received from the media device 310, albeit enhanced. In situations in which the media device 310 includes loudspeakers of its own, the media device 310 loudspeakers may preferably be powered down while the noise cancelling soundbar 320 is in use, such that only the noise cancelling soundbar 320 is generating audible sounds pertaining to the media that the user is viewing. The volume of the soundbar output audio 337 may be controlled by means of a volume control module 390, which may allow communication with, for example, a remote control.

The one or more loudspeakers 330 may be mounted on a rotatable (or otherwise moveable/adjustable) base 335, which may in turn be controlled by a driver 336. The moveable/adjustable base 335 may be underneath the one or more loudspeakers 330, and may be used to adjust the angle of the one or more loudspeakers 330, thereby adjusting the directional output of the soundbar output audio 337. In this manner, the one or more loudspeakers 330 may be adjusted such that the soundbar output audio 337 may be precisely aimed (or otherwise directed) at a user's ears. As a result, a lower volume is required for the soundbar output audio 337 to be clearly heard by the user.

The noise cancelling soundbar 320 may further comprise one or more microphones 340, which may be used to measure ambient noise 327. The ambient noise 327 may be processed by an active noise cancelling module 375, to create a negative output audio which may destructively interfere with the ambient noise 327 when combined with the ambient noise 327. Preferably, the negative output audio may be emitted from the one or more loudspeakers 330, such that the negative output audio largely cancels out any disruption by the ambient noise 327 to a user of the noise cancelling soundbar 320. The one or more microphones 340 may be mounted on a rotatable (or otherwise moveable/adjustable) base 335, which may be used to adjust the angle of the one or more microphones 340 in order to improve the measurement of ambient noise 327.

Figure 4:
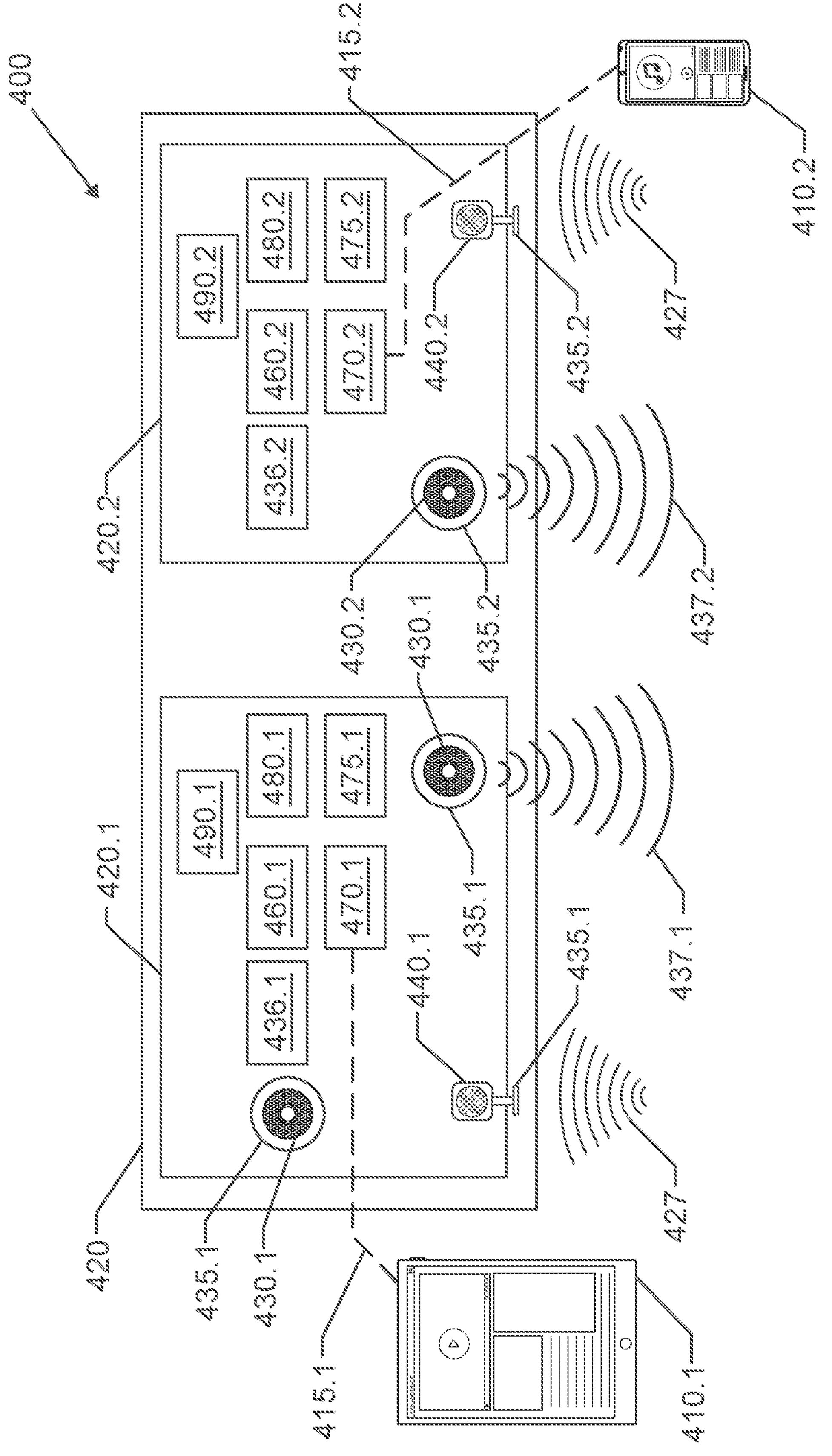
FIG. 4 is an illustration of a noise cancelling soundbar system.

FIG. 4 is an illustration of another embodiment of a noise cancelling soundbar system 400. As shown in FIG. 4, the noise cancelling soundbar system 400 may comprise a first noise cancelling soundbar 420.1 and a second noise cancelling soundbar 420.2. In the follow detailed description, reference numerals ending in ". 1" designate that the component is part of the first noise cancelling soundbar 420.1, while reference numerals ending in "0.2" designate that the component is part of the second noise cancelling soundbar 420.2.

The first noise cancelling soundbar 420.1 and the second noise cancelling soundbar 420.2 may each comprise one or more loudspeakers 430.1/430.2, one or more microphones 440.1/440.2, a processor 460.1/460.2, a wireless communication module 470.1/470.2, and a signal preamplifier 480.1/480.2, respectively. The first noise cancelling soundbar 420.1 and the second noise cancelling soundbar 420.2 may each be capable of receiving a first and second audio input 415.1/415.2 from a first and second media device 410.1/410.2, respectively, amplifying the audio signal, and subsequently emitted the amplified audio through directionally adjustable loudspeakers. In this regard, each soundbar may act similarly to the detailed description provided above for FIG. 3.

By using one or more noise cancelling soundbars in tandem, the noise cancelling soundbar system 400 provides a uniquely effective way for listeners to soundproof themselves against ambient noise in the vicinity of all interconnected noise cancelling soundbars. For clarity, the following description will focus primarily on the components and features of the first noise cancelling soundbar 420.1. However, unless explicitly stated otherwise, it is to be understood that the second noise cancelling soundbar 420.2 may preferably include the same components and features of the first noise cancelling soundbar 420.1.

As shown in FIG. 4, the first noise cancelling soundbar 420.1 may receive an audio input signal 415.1 from a media device 410.1, such as a TV, smartphone, tablet, or other device capable of playing audio and/or audiovisual media. The audio input signal 415.1 may be enhanced by the signal preamplifier 480.1, and then subsequently transmitted to the one or more loudspeakers 430.1 for broadcasting. The one or more microphones 440.1 may be used to measure ambient noise 427 for processing by an active noise cancellation module 475.1. By doing so, the first noise cancelling soundbar 420.1 may generate a first negative output audio which may destructively interfere with the ambient noise 427. The first negative output audio may be projected from the first one or more loudspeakers 430.1, as part of the first soundbar output audio 437.1.

The ambient noise 427, which may be measured by the one or more microphones 440.1 may include the second soundbar output audio 437.2 (i.e., any output audio produced by the noise cancelling soundbar 420.2), as well as any ambient noise 427 present in the vicinity of the second noise cancelling soundbar 420.2, which was not produced by the second noise cancelling soundbar 420.2. The reverse is true for the one or more microphones 440.2 of the second noise cancelling soundbar 420.2. Specifically, the one or more microphones 440.2 of the second noise cancelling soundbar 420.2 may measure both the first soundbar output audio 437.1 and ambient noise 427 present in the vicinity of the first noise cancelling soundbar 420.1. The second noise cancelling soundbar 420.2 may then, by means of an active noise cancelling module 475.2, generate a second negative output audio which may destructively interfere with, or neutralize, the first soundbar output audio 437.1. In this manner a person near soundbar 420.2 may experience a reduced level of ambient noise, including noise made by the first noise cancelling soundbar 420.1. The second negative output audio may be projected from the second one or more loudspeakers 430.2, as part of the soundbar output audio 437.2. Preferably, the volume of the first and output audio 437.1 and the second soundbar output audio 437.2 may be controlled by means of a first volume control module 490.1 and a second volume control module 490.2, respectively.

Alternatively, and/or in addition to, the first and second noise cancelling soundbars may directly communicate with each other to produce more effective negative sound waves for cancelling out unwanted audio. For example, the second noise cancelling soundbar 420.2 may directly process the first audio input signal 415.1 via the second active noise cancelling module 475.2. The first noise cancelling soundbar 420.1 may use a similar method to directly process the second audio input signal 415.2. In this way, each individual soundbar may more effectively produce a negative audio output that is designed to neutralize the (positive) audio output of the other soundbar, enabling users of each individual soundbar to enjoy their respective programming without disturbing other users or having to wear headphones.

The ambient noise 427 which may be detected by the microphones to generate counterpart cancelling negative sound waves may additionally include naturally generated noises within the vicinity of the noise cancelling soundbar system 400, such as a user's snoring or nearby traffic or construction sounds. In one embodiment, the first and second soundbars may be separately installed in different locations, rather than on a single soundbar support board 420 as shown in FIG. 4. For example, the first noise cancelling soundbar 420.1 may be installed in or near the headrest of an office chair, with the second noise cancelling soundbar 420.2 installed on the outside of the office door housing the office chair. Both soundbars may be activated even without any media device input, instead being used primarily for their ability to detect ambient noise 427 and create negative sound waves that destructively interfere with the ambient noise 427. The rotatable stands 435.1/435.2 for the loudspeakers and microphones allow for each individual soundbar to be adjusted for optimal ambient noise detection, and aiming of the first and second negative output audios. Preferably, a first driver 436.1 and a second driver 436.2 may be able to control the movements of the first and second rotatable stands 435.2/435.2, respectively.

Figure 5:
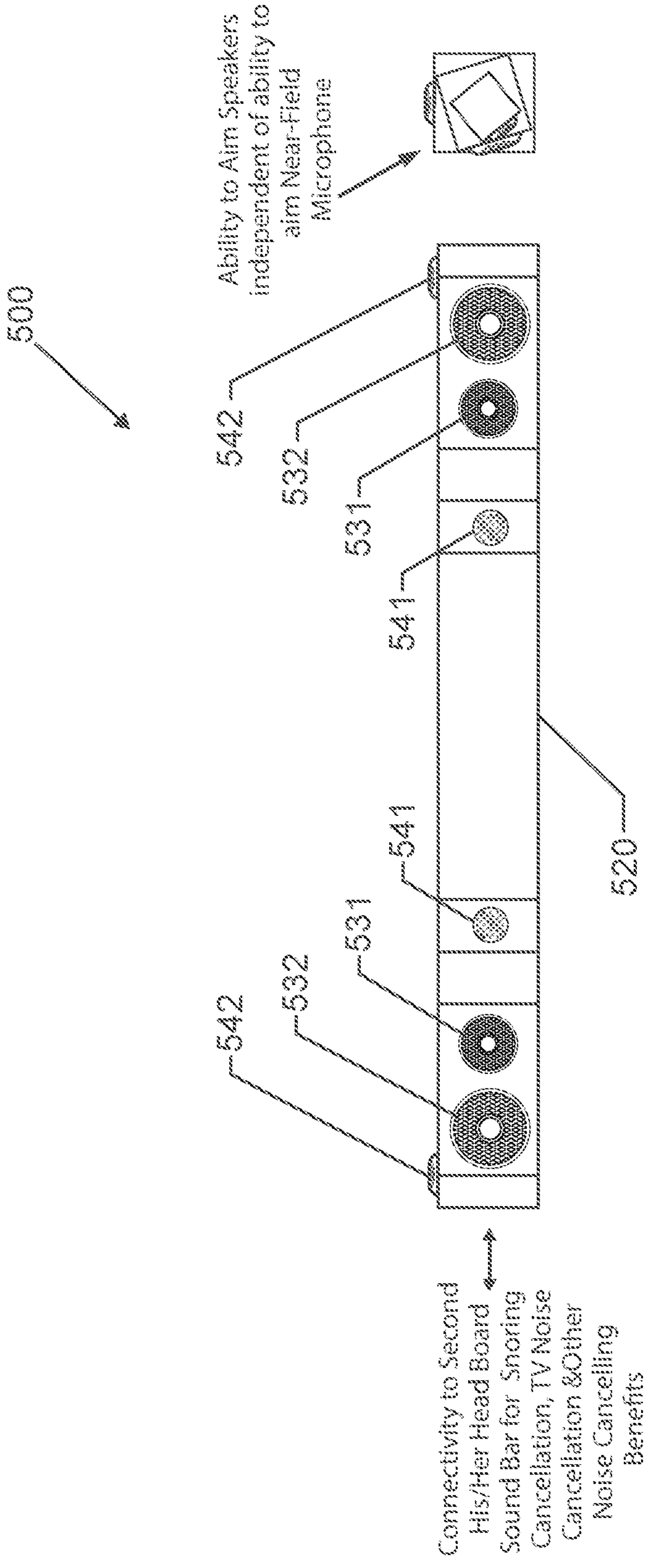
FIG. 5 is an illustration detailing various microphone and loudspeaker types that may be used with a noise cancelling soundbar.

FIG. 5 is a schematic view of one embodiment of a noise cancelling soundbar system 500, providing additional detail on the types of microphones and loudspeakers that may be used. As shown in FIG. 5, the noise cancelling soundbar 520 may comprise one or more near-field sensing microphones 541, one or more ambient sound sensing microphones 542, one or more tweeter speakers 531, and one or more mid-range speakers 532. The one or more near-field sensing microphones 541 and the one or more ambient sound sensing microphones 542 may be used to sense sounds that are near and far from the noise cancelling soundbar 520, respectively. The one or more tweeter speakers 531 and the one or more mid-range speakers 532 may be used to produce high and mid-low range output audio, respectively.

Figure 6:
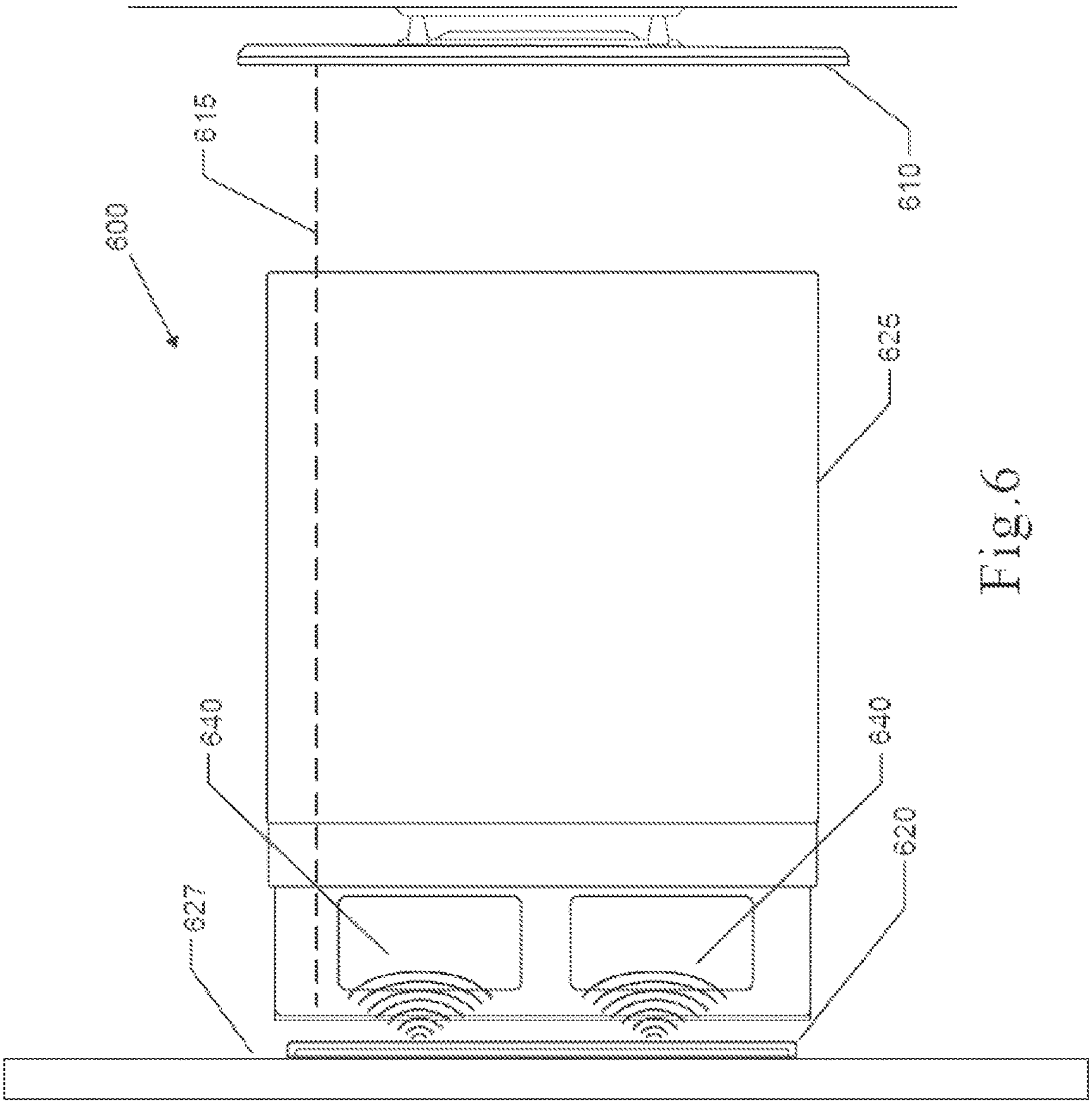
FIG. 6 is an illustration showing one embodiment of a noise cancelling soundbar system that is mounted to a wall.

FIG. 6 is an illustration showing one embodiment of a noise cancelling soundbar system that is mounted to a wall. As shown in FIG. 6, the system 600 may comprise a noise cancelling soundbar 620 that may receive an audio input 615 from a media device 610, such as a television. The audio input 615 may be transmitted to the noise cancelling soundbar 620 wirelessly or with a wired connection. Rather than being installed directly under the media device 610, the noise cancelling soundbar 620 may preferably be installed directly on the wall 627 near the head of a bed 625. By placing the noise cancelling soundbar 620 on the wall 627 near the head of the bed 625, the audio output 640 of the noise cancelling soundbar 620 requires a much lower volume in order to be heard by anyone trying to view the programming of the media device 610 while lying down in the bed 625. While reference is made to a bed 625, it is to be understood that the noise cancelling soundbar 620 may similarly be installed on or near the headrests of sofas, lounge chairs, futons, and the like, to produce the same effect.

Figure 7:
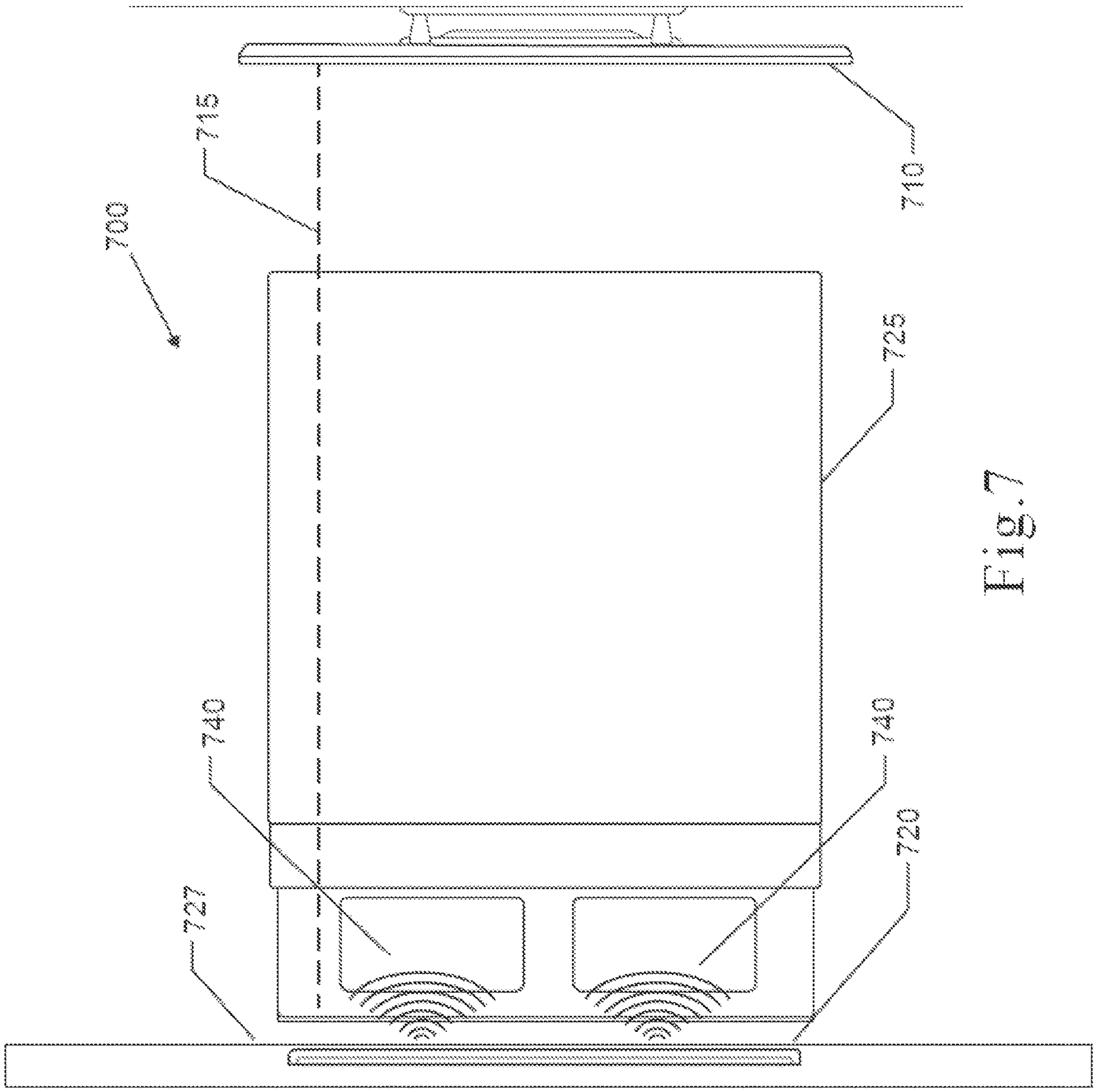
FIG. 7 is an illustration showing one embodiment of a noise cancelling soundbar installed into a wall.

FIG. 7 is an illustration showing one embodiment of a noise cancelling soundbar installed into a wall. As shown in FIG. 7, the system 700 may comprise a noise cancelling soundbar 720 that may receive an audio input 715 from a media device 710, such as a television. The audio input 715 may be transmitted to the noise cancelling soundbar 720 wirelessly or with a wired connection. Rather than being installed directly under the media device 710, the noise cancelling soundbar 720 may preferably be installed directly into the wall 727 at or near the head of a bed 725. By placing the noise cancelling soundbar 720 in the wall 727 near the head of the bed 725, the audio output 740 of the noise cancelling soundbar 720 requires a much lower volume in order to be heard by anyone trying to view the programming of the media device 710 while lying down in the bed 725. While reference is made to a bed 725, it is to be understood that the noise cancelling soundbar 720 may similarly be installed on or near the head end of sofas, lounge chairs, futons, and the like, to produce the same effect.

Figure 8:
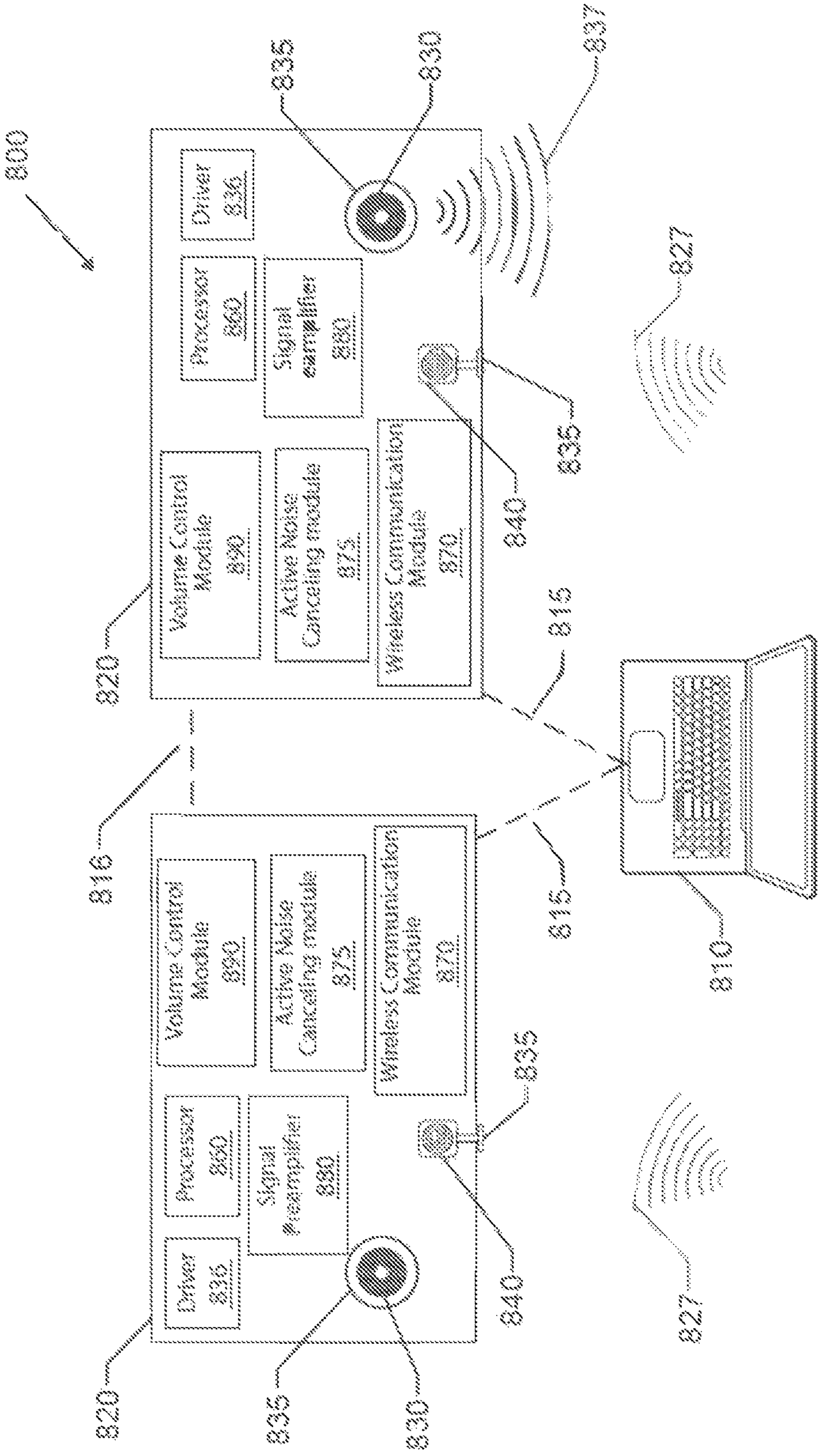
FIG. 8 is an illustration of one embodiment of noise canceling soundbars showing two noise canceling sound bars connect to each other and a controller.

FIG. 8 is an illustration of one embodiment of noise canceling soundbars showing two noise canceling sound bars connect to each other and a controller. As shown in FIG. 8, the noise cancelling soundbar system 800 may comprise at least two noise cancelling soundbars 820 connected to each other wired or wireless 816, each preferably comprising one or more loudspeakers 830, one or more microphones 840, a processor 860, a wireless communication module 870, and a signal preamplifier 880. The noise cancelling soundbars 820 may receive an audio input signal 815 from a media device 810, such as a television (TV), smartphone, tablet, computer, as shown, or other device capable of playing audio and/or audiovisual media. The audio input signals 815 may be transmitted to the noise cancelling soundbars 820 wirelessly and be received by the wireless communication modules 870. The audio input signals 815 may, alternatively, be transmitted to the noise cancelling soundbars 820 via a wired connection.

The audio input signal 815 may be enhanced by the signal preamplifier 880, and then subsequently sent or transmitted to the one or more loudspeakers 830 for broadcasting. The one or more loudspeakers 830 may use the amplified audio input signal to create a soundbar output audio 837, which is only shown in one of the two soundbars 820, but may be created and sent by both soundbars 820. The soundbar output audio 837 may be a faithful reproduction of the audio input signal 815 received from the media device 810, albeit enhanced or otherwise amplified. In some embodiments in which the media device 810 includes loudspeakers of its own, the media device 810 loudspeakers may preferably be powered down while the noise cancelling soundbars 820 are in use, such that only the noise cancelling soundbars 820 generate audible sounds pertaining to the media that the user is viewing through media device 810. The volume of the soundbar output audio 837 may be controlled by means of a volume control module 890, which may allow communication with, for example, a remote control.

The one or more loudspeakers 830 may be mounted on a rotatable (or otherwise moveable/adjustable) base 835, which may in turn be controlled by a driver 836. The rotatable base 835 may be underneath the one or more loudspeakers 830 and may be used to adjust the angle of the one or more loudspeakers 830, thereby adjusting the directional output of the soundbar output audio 837. In this manner, the one or more loudspeakers 830 may be adjusted such that the soundbar output audio 837 may be precisely aimed (or otherwise directed) at a user's ears. As a result, a substantially lower volume is required for the soundbar output audio 837 to be clearly heard by the user.

The noise cancelling soundbars 820 may further comprise one or more microphones 840, which may be used to measure ambient noise 827. The ambient noise 827 may be processed by an active noise cancelling module 875, to create a negative output audio which may destructively interfere with the ambient noise 827 when combined with the ambient noise 827. Preferably, the negative output audio may be emitted from the one or more loudspeakers 830, such that the negative output audio substantially cancels out any disruption by the ambient noise 827 to a user/s of the noise cancelling soundbars 820. The one or more microphones 840 may be mounted on a rotatable (or otherwise moveable/adjustable) bases 835, which may be used to adjust the angle of the one or more microphones 840 in order to improve the measurement of ambient noise 827. The base 835 may be controlled by drivers 836.

Preferably, the soundbars 820 may be physically connected to each other in a removeable manner. They may operate independently or in concert with each other for one, two, or more users. The soundbars 820 may be mounted or integrated into a wall, a headboard, or other piece of furniture.

Figure 9:
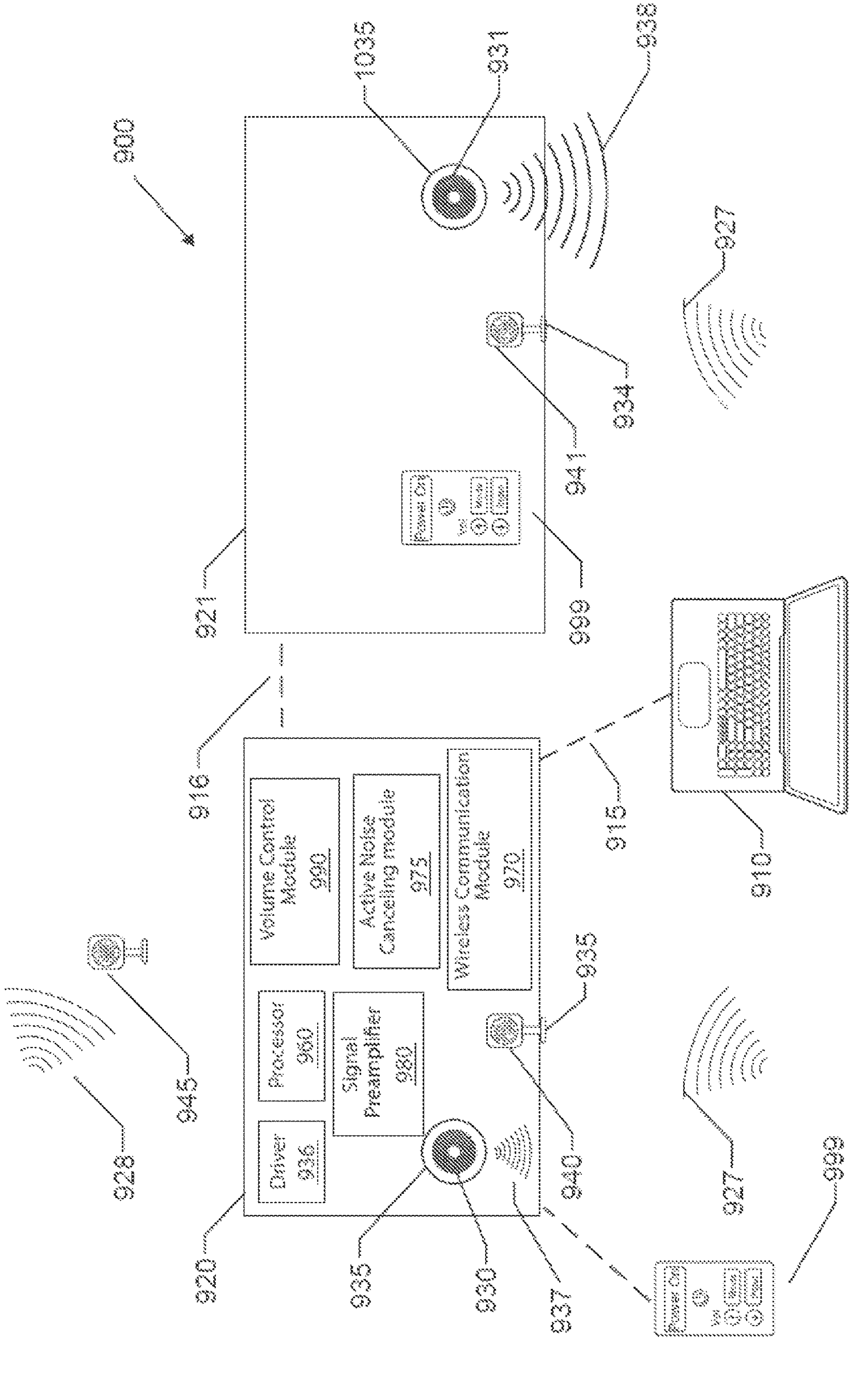
FIG. 9 is an illustration showing one embodiment of a noise cancelling soundbar system that includes a slave unit.

FIG. 9 is an illustration showing one embodiment of a noise cancelling soundbar system that includes a slave unit. As shown in FIG. 9, the noise cancelling soundbar system 900 may comprise a noise cancelling soundbar 920, which may be connected 916, wired or wireless, to a noise cancelling soundbar slave device 921. FIG. 9 shows that the noise cancelling soundbar 920 and noise cancelling soundbar slave device 921 may each comprise one or more loudspeakers 930, 931, and one or more microphones 940, 941. Preferably, the noise cancelling soundbar 920 may comprise a processor 960, a wireless communication module 970, and a signal preamplifier 980 that operates both the noise cancelling soundbar 920 and the noise cancelling soundbar slave device 921. The noise cancelling soundbar 920 may receive an audio input signal 915 from a media device 910, such as a television (TV), smartphone, tablet, or other device capable of playing audio and/or audiovisual media. The audio input signal 915 may be transmitted to the noise cancelling soundbar 920 wirelessly and be received by the wireless communication module 970. The audio input signal 915 may, alternatively, be transmitted to the noise cancelling soundbar 920 via a wired connection.

The audio input signal 915 may be enhanced by the signal preamplifier 980, and then subsequently transmitted to the one or more loudspeakers 930, 931 for the user to hear. The one or more loudspeakers 930, 931 may use the (amplified) audio input signal 915 to create a soundbar output audio 937, 938. The soundbar output audio 937, 938 may be a faithful reproduction of the audio input signal 915 received from the media device 910, albeit enhanced and/or amplified. In situations in which the media device 910 includes loudspeakers of its own, the media device 910 loudspeakers may preferably be powered down while the noise cancelling soundbar 920 and noise cancelling soundbar slave device 921 are in use, such that only the noise cancelling soundbar 920 and/or the noise cancelling soundbar slave device 921 are generating audible sounds pertaining to the media that the user is viewing and listening. The volume of the soundbar output audio 937, 938 may be controlled by a volume control module 990, which may allow communication with, for example, a control interface 999.

The one or more loudspeakers 930, 931 may be mounted on a rotatable (or otherwise moveable/adjustable) bases 935, 1035, which may be controlled by driver 936. The rotatable base 935, 1035 may be underneath the one or more loudspeakers 930, 931 and may be used to adjust the angle of the one or more loudspeakers 930, 931, thereby adjusting the directional output of the soundbar output audio 937, 938. In this manner, the one or more loudspeakers 930 may be adjusted such that the soundbar output audio 937, 938 may be precisely aimed (or otherwise directed) at a user's ears. As a result, a lower volume is required for the soundbar output audio 937, 938 to be clearly heard by the user.

The noise cancelling soundbar 920 and noise cancelling soundbar slave device 921, may further comprise one or more microphones 940, 941, which may be used to measure or otherwise determine an ambient noise 927. The ambient noise 927 may be processed by an active noise cancelling module 975, to create a negative output audio that may destructively interfere with the ambient noise 927 when combined with the ambient noise 927. Preferably, the negative output audio may be emitted from the one or more loudspeakers 930, 931, such that the negative output audio largely cancels out any disruption by the ambient noise 927 to a user of the noise cancelling soundbar 920 or noise cancelling soundbar slave device 921. The one or more microphones 940, 941 may be mounted on rotatable (or otherwise moveable/adjustable) bases 935, 934, which may be used to adjust the angle of the one or more microphones 940, 941 in order to improve the measurement of ambient noise 927. The bases 934, 935 may be controlled manually or by driver 936.

The noise cancelling soundbar system 900 may be in communication with one or more external (or remote) microphones 945, that are positioned apart from the noise cancelling soundbars/slaves 920, 921. The external microphone(s) 945 may connect to the noise cancelling soundbar 920 via a wired or wireless interface. The external microphone(s) 945 may be used to measure ambient noise 928 (external ambient noise) not directly near (greater than 2 meters away) the noise cancelling soundbar system. The ambient noise 928 may be processed by an active noise cancelling module 975, to create a negative output audio which may destructively interfere with the ambient noise 928 when combined with the ambient noise 928. Preferably, the negative output audio may be emitted from the one or more loudspeakers 930, 931, such that the negative output audio largely cancels out any disruption by the ambient noise 928 to a user of the noise cancelling soundbar system 900. Preferably, the one or more external microphones 945 may be moveable and repositionable to areas in a room or outside of a room to most advantageously create a negative output audio for destructively cancelling the ambient noise 928. The external microphones 945 may be connected to moveable and rotatable bases similar to bases 935, 1035.

The noise cancelling soundbar system 900 may be connected to one or more control interface 999, such as a remote control unit, which may be a separate unit or may be mounted into or onto the noise cancelling soundbar 920, noise cancelling soundbar slave device 921, into room furnishings (i.e. headboard, nightstand), into or onto a wall, or be used as a separate handheld device. The control interface 999 may connect to the noise cancelling soundbar system 900 via wired or wireless connectivity. The control interface 999 can also be operated and/or adjusted by the media device 910 (i.e., computers, smart phones, control systems). In other embodiments, the control interface 999 is a computer, smart phone, or other control system.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A noise cancelling system, comprising:

a first noise cancelling soundbar;

wherein said first noise cancelling soundbar comprises: at least one first loudspeaker; at least one first microphone, which is configured to sense and measure a first ambient noise; and a first active noise cancelling module, which is configured to be in communication with said at least one first loudspeaker and said at least one first microphone;

wherein said first active noise cancelling module processes said first ambient noise to create a first negative output audio;

wherein said first negative output audio is configured to be projected from said at least one first loudspeaker; and wherein said first negative output audio, when projected from said at least one first loudspeaker, destructively interferes with said first ambient noise;

a second noise cancelling soundbar;

wherein said second noise cancelling soundbar comprises: at least one second loudspeaker; at least one second microphone, which is configured to sense and measure a second ambient noise; and a second active noise cancelling module, which is configured to be in communication with said at least one second loudspeaker and said at least one second microphone;

wherein said second active noise cancelling module processes said second ambient noise to create a second negative output audio;

wherein said second negative output audio is configured to be projected from said at least one second loudspeaker; and wherein said second negative output audio, when projected from said at least one second loudspeaker, destructively interferes with said second ambient noise;

wherein said first and second noise cancelling soundbar are configured to be in communication with each other, such that they work together to destructively interfere with said first and second ambient noises.

2. The noise cancelling system of claim 1, wherein said first and second noise cancelling soundbars are physically connected to each other.

3. The noise cancelling system of claim 1, wherein said first and second noise cancelling soundbars are physically separate units and are in wired communication with each other.

4. The noise cancelling system of claim 1, wherein said first and second noise cancelling soundbars are physically separate units and are in wireless communication with each other.

5. The noise cancelling system of claim 1, wherein said first and second noise cancelling soundbars are configured to be engaged to or in one or more structures selected from the group of structures consisting of one or more of: a wall; a headboard; and combinations thereof.

6. The noise cancelling system of claim 1:

wherein said first noise cancelling soundbar further comprises:

at least one first adjustable loudspeaker base; and at least one first adjustable microphone base;

wherein said at least one first loudspeaker is mounted on said at least one first adjustable loudspeaker base;

wherein said at least one first microphone is mounted on said at least one first adjustable microphone base;

wherein said at least one first adjustable loudspeaker base is configured to be adjustable so as to adjust an angle of said at least one first loudspeaker, thereby adjusting said first negative output audio, such that said first negative output audio is configured to destructively interfere with said first ambient noise; and wherein said at least one first adjustable microphone base is configured to adjust an angle of said at least one first microphone to improve sensing and measuring of said first ambient noise;

wherein said second noise cancelling soundbar further comprises:

at least one second adjustable loudspeaker base; and at least one second adjustable microphone base;

wherein said at least one second loudspeaker is mounted on said at least one second adjustable loudspeaker base;

wherein said at least one second microphone is mounted on said at least one second adjustable microphone base;

wherein said at least one second adjustable loudspeaker base is configured to be adjustable so as to adjust an angle of said at least one second loudspeaker, thereby adjusting said second negative output audio, such that said second negative output audio is configured to destructively interfere with said second ambient noise; and wherein said at least one second adjustable microphone base is configured to adjust an angle of said at least one second microphone to improve sensing and measuring of said second ambient noise.

7. The noise cancelling system of claim 1, wherein said first ambient noise experienced by a user is substantially reduced when said first ambient noise is destructively interfered with by said first negative audio output; and wherein said second ambient noise experienced by a second user is substantially reduced when said second ambient noise is destructively interfered with by said second negative audio output.

8. The noise cancelling system of claim 1, wherein said first and second noise cancelling soundbars are configured to receive an audio signal from one or more media sources and subsequently play the audio signal from said first and second loudspeakers.

9. The noise cancelling system of claim 1, wherein said first and second ambient noises are substantially the same.

10. The noise cancelling system of claim 1, wherein said first and second noise cancelling soundbars are configured to be controlled by a control interface.

11. The noise cancelling system of claim 1, further comprising at least one external microphone, which is configured to sense and measure an external ambient noise;

wherein said at least one external microphone is configured to be in communication with first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

12. The noise cancelling system of claim 1, wherein said first noise cancelling soundbar is configured to be in communication with at least one external microphone, which is configured to sense and measure an external ambient noise;

wherein said at least one external microphone is configured to be in communication with first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

13. A noise cancelling system, comprising:

a first noise cancelling soundbar;

wherein said first noise cancelling soundbar comprises: at least one first loudspeaker; at least one first microphone, which is configured to sense and measure a first ambient noise; and a first active noise cancelling module, which is configured to be in communication with said at least one first loudspeaker and said at least one first microphone;

wherein said first active noise cancelling module processes said first ambient noise to create a first negative output audio;

wherein said first negative output audio is configured to be projected from said at least one first loudspeaker; and wherein said first negative output audio, when projected from said at least one first loudspeaker, destructively interferes with said first ambient noise;

a noise cancelling soundbar slave device;

wherein said noise cancelling soundbar slave device comprises: at least one slave loudspeaker, which is configured to be in communication with said first active noise cancelling module; and at least one slave microphone, which is configured to be in communication with said first active noise cancelling module, and which is configured to sense and measure a slave ambient noise;

wherein said first active noise cancelling module processes said slave ambient noise to create a slave negative output audio;

wherein said slave negative output audio is configured to be projected from said at least one slave loudspeaker; and wherein said slave negative output audio, when projected from said at least one slave loudspeaker, destructively interferes with said slave ambient noise;

wherein said noise cancelling soundbar slave device is configured to be in communication with said first noise cancelling soundbar, such that they work together to destructively interfere with said first ambient noise and slave ambient noise.

14. The noise cancelling system of claim 13, wherein said first noise cancelling soundbar is physically connected to said noise cancelling soundbar slave device.

15. The noise cancelling system of claim 13, wherein said first noise cancelling soundbar is wire connected to said noise cancelling soundbar slave device.

16. The noise cancelling system of claim 13, wherein said first noise cancelling soundbar is wirelessly connected to said noise cancelling soundbar slave device.

17. The noise cancelling system of claim 13, wherein said first noise cancelling soundbar and said noise cancelling soundbar slave device are configured to be engaged to or in one or more structures selected from the group of structures consisting of one or more of: a wall; a headboard; and combinations thereof.

18. The noise cancelling system of claim 13:

wherein said first noise cancelling soundbar further comprises:

at least one first adjustable loudspeaker base; and at least one first adjustable microphone base;

wherein said at least one first loudspeaker is mounted on said at least one first adjustable loudspeaker base;

wherein said at least one first microphone is mounted on said at least one first adjustable microphone base;

wherein said at least one first adjustable loudspeaker base is configured to be adjustable so as to adjust an angle of said at least one first loudspeaker, thereby adjusting said first negative output audio, such that said first negative output audio is configured to destructively interfere with said first ambient noise; and wherein said at least one first adjustable microphone base is configured to adjust an angle of said at least one first microphone to improve sensing and measuring of said first ambient noise;

wherein said noise cancelling soundbar slave device further comprises:

at least one slave adjustable loudspeaker base; and at least one slave adjustable microphone base;

wherein said at least one slave loudspeaker is mounted on said at least one slave adjustable loudspeaker base;

wherein said at least one slave microphone is mounted on said at least one slave adjustable microphone base;

wherein said at least one slave adjustable loudspeaker base is configured to be adjustable so as to adjust an angle of said at least one slave loudspeaker, thereby adjusting said slave negative output audio, such that said slave negative output audio is configured to destructively interfere with said slave ambient noise; and wherein said at least one slave adjustable microphone base is configured to adjust an angle of said at least one slave microphone to improve sensing and measuring of said slave ambient noise.

19. The noise cancelling system of claim 13, wherein said first ambient noise experienced by a user is substantially reduced when said first ambient noise is destructively interfered with by said first negative audio output; and wherein said slave ambient noise experienced by a second user is substantially reduced when said slave ambient noise is destructively interfered with by said slave negative audio output.

20. The noise cancelling soundbar of claim 13, wherein said first noise cancelling soundbar is configured to receive an audio signal from one or more media sources and subsequently play said audio signal from said at least one first loudspeaker and said at least one slave loudspeaker.

21. The noise cancelling soundbar of claim 13, wherein said first ambient noise and slave ambient noise are substantially the same.

22. The noise cancelling system of claim 13, wherein said first noise cancelling soundbar and said noise canceling soundbar slave device is configured to be controlled by a control interface.

23. The noise cancelling system of claim 13, further comprising at least one external microphone, which is configured to sense and measure an external ambient noise;

wherein said at least one external microphone is configured to be in communication with first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

24. The noise cancelling system of claim 13, wherein said first noise controlling soundbar is configured to be in communication with at least one external microphone, which is configured to sense and measure an external ambient noise;

wherein said at least one external microphone is configured to be in communication with first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

25. A noise cancelling system, comprising:

a first noise cancelling soundbar;

wherein said first noise cancelling soundbar comprises: at least one first loudspeaker; at least one first microphone, which is configured to sense and measure a first ambient noise; a first active noise cancelling module, which is configured to be in communication with said at least one first loudspeaker and said at least one first microphone; at least one first adjustable loudspeaker base; and at least one first adjustable microphone base;

wherein said first active noise cancelling module processes said first ambient noise to create a first negative output audio;

wherein said first negative output audio is configured to be projected from said at least one first loudspeaker; and wherein said first negative output audio, when projected from said at least one first loudspeaker, destructively interferes with said first ambient noise;

wherein said first noise cancelling soundbar is configured to be engaged to or in one or more structures selected from the group of structures consisting of one or more of: a wall; a headboard; and combinations thereof;

wherein said at least one first loudspeaker is mounted on said at least one first adjustable loudspeaker base;

wherein said at least one first microphone is mounted on said at least one first adjustable microphone base;

wherein said at least one first adjustable loudspeaker base is configured to be adjustable so as to adjust an angle of said at least one first loudspeaker, thereby adjusting said first negative output audio, such that said first negative output audio is configured to destructively interfere with said first ambient noise; and wherein said at least one first adjustable microphone base is configured to adjust an angle of said at least one first microphone to improve sensing and measuring of said first ambient noise.

26. The noise cancelling system of claim 25, wherein said first ambient noise experienced by a user is substantially reduced when said first ambient noise is destructively interfered with by said first negative audio output.

27. The noise cancelling system of claim 25, wherein said first noise cancelling soundbar is configured to receive an audio signal from one or more media sources and subsequently play the audio signal from said first loudspeaker.

28. The noise cancelling system of claim 25, wherein said first noise cancelling soundbar is configured to be controlled by a control interface.

29. The noise cancelling system of claim 25, further comprising at least one external microphone, which is configured to sense and measure an external ambient noise;

wherein said at least one external microphone is configured to be in communication with first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

30. The noise cancelling system of claim 25, wherein said first noise cancelling soundbar is configured to be in communication with at least one external microphone, which is configured to sense and measure an external ambient noise;

wherein said at least one external microphone is configured to be in communication with first active noise cancelling module;

wherein said first active noise cancelling module processes said external ambient noise to create an external negative output audio;

wherein said external negative output audio is configured to be projected from said at least one first loudspeaker; and wherein said external negative output audio, when projected from said at least one first loudspeaker, destructively interferes with said external ambient noise.

* * * * *